United States Patent [19]
Lambert

[11] 3,967,031
[45] June 29, 1976

[54] PRINTABLE PRESSURE-SENSITIVE ADHESIVE TAPE

[75] Inventor: Richard J. Lambert, Lake Elmo, Minn.

[73] Assignee: Minnesota Mining and Manufacturing Company, St. Paul, Minn.

[22] Filed: Apr. 25, 1974

[21] Appl. No.: 463,979

Related U.S. Application Data

[63] Continuation-in-part of Ser. No. 252,096, May 10, 1972, abandoned.

[52] U.S. Cl. .................................. 428/294; 428/352
[51] Int. Cl.² ............................................. C09J 7/02
[58] Field of Search .......... 117/68.5, 122 PF, 122 P, 117/76 A, 161 C, 161 KP, 161 K; 260/16, 17 R; 428/294, 295, 352

[56] References Cited
UNITED STATES PATENTS

| | | | |
|---|---|---|---|
| 2,746,696 | 5/1956 | Tierney | 242/159 |
| 2,818,169 | 12/1957 | Bergstedt et al. | 117/122 X |
| 2,818,349 | 12/1957 | Bergstedt et al. | 117/122 X |
| 3,062,683 | 11/1962 | Kalleberg et al. | 117/122 |
| 3,073,734 | 1/1963 | Bemmels | 117/122 X |
| 3,152,940 | 10/1964 | Abel et al. | 156/157 |
| 3,247,956 | 4/1966 | Rosen | 117/122 X |
| 3,477,969 | 11/1969 | Parker | 260/17 |
| 3,543,920 | 12/1970 | Crocker | 206/59 |
| 3,657,001 | 4/1972 | Parker | 117/105.1 |
| 3,671,293 | 6/1972 | Walle | 117/74 |
| 3,676,377 | 7/1972 | Anderson | 260/15 |
| 3,718,495 | 2/1973 | Tomita | 117/122 X |
| 3,773,538 | 11/1973 | Milutin et al. | 117/15 |

*Primary Examiner*—Bernard D. Pianalto
*Attorney, Agent, or Firm*—Alexander, Sell, Steldt & DeLaHunt

[57] ABSTRACT

Pressure-sensitive adhesive tape having a backsize which is a blend of (1) 5–80 parts cellulose acetate butyrate and (2) 95–20 parts copolyester and/or acrylate copolymer has both printability and low-unwind characteristics. After the back is printed, the tape can be wound into a roll and unwound without destroying the legibility of the printing. The backsize is especially useful on tapes having a polyester or unplasticized polyvinyl chloride film backing, as well as on filament tape or other tapes which have aggressive pressure-sensitive adhesives.

6 Claims, No Drawings

PRINTABLE PRESSURE-SENSITIVE ADHESIVE TAPE

CROSS-REFERENCE TO RELATED APPLICATION

This application is a continuation-in-part of copending Ser. No. 252,096 filed May 10, 1972 and now abandoned.

BACKGROUND OF THE INVENTION

This invention relates to printable pressure-sensitive adhesive tape, a preferred embodiment relating to packaging tapes which have aggressive, high performance adhesives.

A standard item of commerce for many years have been a family of printable pressure-sensitive adhesive tapes. The backing of such tapes must, of course, be receptive to flexographic ink or other printing inks; if the nature of the backing is such that it does not inherently possess ink-receptivity, it is necessary to provide some type of coating which imparts that characteristic. Printable tapes have, however, always embodied a compromise. For example, after a tape is printed, it is typically wound convolutely upon itself in roll form, subsequently unwound and cut to the desired length when it is to be used. If the adhesive is extremely aggressive, it tends to remove all or part of the printed indicia from the back during the unwinding process. Although the transfer of such indicia can be eliminated, or at least inhibited, by the application of a low-adhesion backsize following the printing operation, this necessitates an extra step and increases the cost of the product. Hence, where the tape is to be printed, adhesives having low to moderate adhesion are usually employed.

Others have previously attempted to solve the problem of obtaining a backsize coating which has the combined characteristics of adhesion to the backing, ink retention and good unwind characteristics. In this regard, see Canadian Pat. No. 772,120, which discloses the use of acrylate and methacrylate polymers and copolymers as a backsize. Attention is also directed to German Offenlegungsschrift No. 2,018,929, which describes modifying the backsize of the Canadian patent by blending with it a vinylidene chloride: acrylonitrile copolymer. Each of these two backsizes is useful to a degree, but neither functions effectively when the face side of the tape is provided with a strongly aggressive pressure-sensitive adhesive. When such an adhesive is employed (as is commonly the case with packaging tapes), unwinding a printed roll or tape results in (1) removing an unacceptable amount of the printed indicia and/or (2) an unacceptably high unwind force.

SUMMARY

The present invention provides a novel pressure-sensitive adhesive tape structure which can be readily printed, especially with flexographic ink, and yet which resists removal of the printed indicia even when a highly agressive pressure-sensitive adhesive tape is applied thereover and subsequently removed. The invention thus has great utility in the preparation of printable tapes which are to be semi-permanently adhered to a desired substrate, such tape may be made on almost any type of backing, unplasticized polyvinyl chloride (UPVC) film representing one excellent example. The invention likewise finds highly commercial application in the preparation of high-strength tape for strapping or packaging operations; such tape may have as a backing an oriented UPVC film. Alternatively, strapping or packaging tape may have a backing of biaxially oriented polyethylene terephthalate film with lineally aligned filaments incorporated in the pressure-sensitive adhesive.

In accordance with the invention, pressure-sensitive adhesive tape (especially tape having an exposed back surface of unplasticized polyvinyl chloride film or polyethyleneterephthalate film) is provided with a thin backsize coating which is a blend of polymers consisting essentially of 5–80 parts by weight of cellulose acetate butyrate and correspondingly 95–20 parts by weight of synthetic polymer selected from the class consisting of linear saturated ethylene terephthalate:ethylene isophthalate copolyesters and ethyl acrylate:methyl methacrylate copolymers. It also appears that receptivity of the backing to a wider variety of inks can be achieved by blending with the previously mentioned polymers a minor amount of some other polymer, e.g., a polyester urethane, a suitable composition containing approximately equal parts by weight of each component.

The combined features of printability and low adhesion imparted by the backsizes of this invention is synergistic and unexpected. To illustrate, a backsize of cellulose acetate butyrate alone imparts good unwind characteristics, but it also imparts poor ink retention. When either copolyesters or acrylate copolymers are used as the sole backsize component, the tape typically has good ink retention but excessively high unwind characteristics; perversely, however, copolyesters may display exactly the opposite characteristics.

In practicing this invention, a solution of the blended polymers is applied to the back surface of the tape backing and the solvent evaporated to leave a coating less than 1 micron thick. It is greatly preferred to utilize solvent systems which result in homogeneous polymer blends.

A wide variety of cellulose acetate butyrate polymers may be used in the practice of this invention, but those having a viscosity of 15 poises or less are especially preferred.

Copolyesters used in the practice of this invention may be prepared by reacting approximately 20 mols of isophthalic acid, 20-25 mols terephthalic acid, 5–10 mols of an aliphatic diacid (e.g., C6 – C10), 25–45 mols of ethylene glycol, and 5–25 mols of another glycol (e.g., 1,6-hexane diol or diethylene glycol).

Suitable acrylate polymers for use in the practice of this invention include lower alkyl esters of acrylic acids and/or methacrylic acid, e.g., a copolymer formed from approximately equal weights of ethyl acrylate and methyl methacrylate.

In summary, the present invention finds two major applications, viz., (1) as a backsize for packaging tapes, which have a very aggressively tacky adhesive and heretofore could not be successfully printed at all, and (2) as a backsize for a wide variety of tapes which employ less aggressively tacky adhesives, to render them printable and more easily unwindable than was previously the case, all by applying a single thin coating to the back side of the tape backing.

TEST PROCEDURES

In evaluating the quality of a tape product made in accordance with the present invention, it has been found helpful to utilize three tests, viz., (1) ink retention, (2) unwind force, and (3) adhesion retention. Each of these tests will now be described in more detail.

Ink Retention.

Using a conventional 2-roll proofer having a 200-line pyramidally knurled roll, a 6 × 36 inch backing sheet is coated with a 2 × 30 inch strip of backsize solution and the solvent evaporated by heating 10 seconds at 180°F. Using the same proofing roll, a 2 × 15 inch coating of standard flexographic ink (e.g., "Gem-Glo" red F-6276, available from Inmont Corporation), is applied over the previously coated area and the solvent evaporated. A 1-inch wide strip of conventional filament tape* is applied along the entire 30-inch coated portion of the backing, and allowed to remain in place for one minute. The uncoated end of the backing is then held firmly in one hand and the extended end of the filament tape doubled back on itself and rapidly ripped off parallel to the backing. The ink retention characteristics are subjectively evaluated according to the following rating:
  0 - No detectable ink transfer
  1 - Slight image appears on tape, caused by splitting of ink layer
  2 - Up to 5% of ink completely removed from backing.
  3 - 5–15% of ink completely removed from backing.
  4 - 20–25% of ink completely removed from backing.
  5 - 25% of ink removed from backing.
A rating of 0–2, or no more than 5% of ink removed, is considered acceptable. * 2-mil biaxially oriented polyethylene terephthalate film backing, with 60 strands of 150-1/0 glass filament (1.0 turn per inch) aligned parallel to the machine direction on one side of the film face and surrounded by an aggressive pressure-sensitive adhesive which holds them in contact with the backing and provides the means for securing the tape in the desired location. The pressure-sensitive adhesive is made by milling 100 parts crude rubber, 90 parts of polyterpene resin (e.g., "Piccolyte" S 115), 2 parts antioxidant (e.g., "Santovar" A), 30 parts ethyl alcohol, and 660 parts heptane to provide a coatable solution, the solvent evaporating after application of the adhesive. Tape of this type is available from 3M Company under the trade designation "SCOTCH" Brand No. 898 Filament Tape.

Unwind force.

A 1 × 11 inch strip of conventional filament tape (as hereinabove described) is adhered to the surface of a 2 × 11 inch piece of the backsized backing to be tested and rolled down into intimate contact with two passes of a 4-pound rubber-covered roller, approximately 1 inch of the filament tape extending beyond the film. The resultant laminate is then wrapped around a horizontally disposed 3.5-inch O.D. metal pipe, filament tape out, so that one end of the laminate is attached to hooks which are positioned at the bottom of the pipe. To the extended end of the filament tape (which after wrapping the laminate around the pipe extends downward) is attached a 1-kg. weight, after which the assembled unit is placed in a 150°F. circulating air oven for 16 hours. The laminate is then removed from the pipe and conditioned at 75°F. and 50% relative humidity for 4–5 hours. The force required to remove the filament tape from the backing is determined according to a modified form of the procedure specified in U.S. Federal Test Method Standard No. 101B, Method 2064. In accordance with this test, the film side of the laminate is adhered, using double-coated pressure-sensitive adhesive tape, to the periphery of a 3-inch diameter cylinder which is mounted on and freely rotatable about a shaft held horizontally in a frame. The free end of the filament tape is extended upward and clamped in the upper jaws of a tensile testing machine, the frame being mounted in the lower jaws. The upper and lower jaws are then separated at a rate of 270 inches per minute, while the unwind force is measured in ounces per inch of width. An acceptable backsize coating will display and unwind value of no more than 70 ounces per inch of width.

Adhesion Retention.

The filament tape which was removed from the backing in the unwind force test just described is applied to a clean glass surface, rolled down with one pass of a 4-lb. rubber roller, and stripped from the glass at a 180° angle at 90 inches per minute while measuring the adhesion value in ounces. If the backsize is inadequately anchored to the backing, it will transfer to the adhesive surface of the filament tape, thereby decreasing its ability to adhere well to the glass surface. If the backsize contains components which migrate into the adhesive, the ability of the filament tape to adhere to glass will be similarly impaired. If the backsize is to be considered acceptable, the adhesion value of the tape should be at least about 90% of that obtained with identical filament tape which has never been in contact with the backsize being evaluated.

DESCRIPTION OF PRESENTLY PREFERRED EMBODIMENTS

Understanding of the invention will be facilitated by referring to illustrative but non-limiting examples, in which all parts are by weight unless otherwise noted. In each case 10 parts of cellulose acetate butyrate was dissolved in 45 parts of toluene and 45 parts of methyl ethyl ketone, using a conventional propeller stirrer. When PE-222 (see definition below) is employed, 10 parts by weight are dissolved in 90 parts of methyl ethyl ketone. When 46950 (which is a 20% solids solution in 70:30 dioxane:toluene--see definition below) was employed, the solution was diluted to 10% solids by adding an equal weight of dioxane. When B-82 (see definition below) was employed, 10 parts by weight were dissolved in 90 parts by weight of toluene. After the polymers to be blended had been dissolved, they were mixed together in the desired proportions, adding toluene as necessary to obtain a homogeneous blend, and applied to the backing in the manner previously indicated or by any other suitable coating technique.

Tabulated below are several examples illustrating the use of backsize coatings which are suitable for the practice of the invention. For comparison, various controls are also listed. The following abbreviations are employed:

CAB - cellulose acetate butyrate (commercially available from Eastman Chemical Company)

| Type | % butyryl | % acetyl | % hydroxyl | melting point, °C. | Viscosity, poises (ASTM test D-871-48) | Specific gravity | Tukon hardness |
|---|---|---|---|---|---|---|---|
| 1/10 sec. | 37 | 13.5 | 2 | 155 | 0.12 – 0.28 | 1.475 | 12 |
| 1/2 sec. | 37 | 13 | 1.5 | 155 | 1.12 – 1.88 | 1.20 | 12 |
| 381-2 | 37 | 13 | 1.7 | 170 | 3.8 – 13.1 | 1.20 | 12 |
| 500-1 | 48 | 6 | 0.7 | — | 3.0 – 4.5 | 1.17 | 8 |
| 551-2 | 53 | 2 | 1.6 | 130 | 2.7 – 5.4 | 1.17 | — |

PET 2-mil biaxially oriented polyethylene terephthalate

PE- 222 copolyester resin formed by reacting the following mols:isophthalic acid, 21; terephthalic acid, 23; diacid such as adipic, 5; ethylene glycol, 27; diol such as 1,6 hexane diol, 24; molecular weight 20-30,000; commercially available as "Vitel"PE-222 from Goodyear Chemical Co.

46950 copolyester resin formed by reacting the following mols:isophthalic acid, 21; terephthalic acid, 20; alkyl diacid such as azelaic, 12; ethylene glycol, 43; diethylene glycol, 4; commercially available from E. I. duPont de Nemours & Co. as 20% solids solution in 70:30 dioxane:toluene under the trade designation Polyester Adhesive 46950.

B-82 47:53 ethyl acrylate:methyl methacrylate (weight ratio) copolymer, commercially available from Rohm & Haas as "Acryloid" B-82

UPVC unplasticized polyvinyl chloride.

Filled UPVC UPVC into which 20 parts titanium dioxide per 100 parts resin has been milled.

| Example | Backing | CAB Type | Parts | Copolyester Type | Parts | Acrylate Type | Parts | Ink retention | Unwind force, oz/in | Adhesion retention, % |
|---|---|---|---|---|---|---|---|---|---|---|
| | Acceptable values | — | — | — | — | — | — | 0-2 | 70 | 90 |
| Control | PET | — | — | — | — | — | — | — | — | — |
| Control | " | 1/10-sec. | 100 | — | — | — | — | 5 | 11 | 1 |
| " | " | — | — | PE-222 | 100 | — | — | 2 | 21 | 22 |
| " | " | — | — | 46950 | 100 | — | — | 1 | 128 | 74 |
| " | " | — | — | — | — | B-82 | 100 | no anchorage to backing | — | — |
| 1 | " | 1/10-sec. | 80 | 46950 | 20 | — | — | 1 | 72 | 110 |
| 2 | " | " | 70 | " | 30 | — | — | 1 | 68 | 97 |
| 3 | " | " | 60 | " | 40 | — | — | 1 | 58 | 100 |
| 4 | " | " | 50 | " | 50 | — | — | 2 | 64 | 102 |
| 5 | " | " | 40 | " | 60 | — | — | 1 | 64 | 104 |
| 6 | " | " | 30 | " | 70 | — | — | 1 | 64 | 102 |
| 7 | " | " | 20 | " | 80 | — | — | 1 | 58 | 100 |
| 8 | " | " | 80 | PE-222 | 20 | — | — | 1 | 68 | 95 |
| 9 | PET | 1/10-sec. | 70 | PE-222 | 30 | — | — | 1-2 | 64 | 95 |
| 10 | " | " | 60 | " | 40 | — | — | 2 | 58 | 95 |
| 11 | " | " | 50 | " | 50 | — | — | 2 | 60 | 95 |
| 12 | " | " | 80 | " | 20 | — | — | 1 | 72 | 110 |
| 13 | " | " | 70 | " | 30 | — | — | 1 | 68 | 97 |
| 14 | " | " | 60 | " | 40 | — | — | 1 | 58 | 100 |
| 15 | " | " | 50 | " | 50 | — | — | 2 | 64 | 102 |
| 16 | " | 1/2-sec. | 80 | " | 20 | — | — | 1 | 72 | 100 |
| 17 | " | " | 50 | " | 50 | — | — | 2 | 58 | 100 |
| 18 | " | " | 20 | " | 80 | — | — | 1 | 52 | 102 |
| 19 | " | 381-2 | 80 | " | 20 | — | — | 1 | 46 | 104 |
| 20 | " | 500-1 | 50 | " | 50 | — | — | 1 | 28 | 102 |
| 21 | " | 551-2 | 50 | " | 50 | — | — | 1 | 60 | 102 |
| 22 | " | " | 20 | " | 80 | — | — | 2 | 36 | 102 |
| Control | UPVC | 1/10-sec. | 100 | — | — | — | — | 5 | 50 | 80 |
| Control | " | — | — | PE-222 | 100 | — | — | 5 | 61 | 89 |
| Control | " | — | — | — | — | B-82 | 100 | 1 | 92 | 102 |
| 23 | " | 1/10-sec. | 50 | PE-222 | 50 | — | — | 2 | 62 | 100 |
| 24 | " | " | 40 | " | 60 | — | — | 1-2 | 66 | 100 |
| 25 | " | " | 30 | " | 70 | — | — | 1 | 56 | 100 |
| 26 | " | " | 20 | " | 80 | — | — | 1 | 58 | 100 |
| 27 | " | " | 50 | — | — | B-82 | 50 | 1 | 66 | 104 |
| 28 | " | " | 40 | — | — | " | 60 | 1 | 60 | 104 |
| 29 | " | " | 30 | — | — | " | 70 | 1 | 62 | 104 |
| 30 | " | " | 20 | — | — | " | 80 | 1 | 60 | 104 |
| 31 | " | " | 10 | — | — | " | 90 | 1 | 62 | 104 |
| Control | filled UPVC | 1/10-sec. | 100 | — | — | — | — | 5 | 52 | 95 |
| Control | — | — | — | PE-222 | 100 | — | — | 5 | 52 | 95 |
| Control | — | — | — | — | — | B-82 | 100 | 1 | 100 | 100 |
| 32 | filled UPVC | 1/10-sec. | 60 | PE-222 | 40 | — | — | 1 | 54 | 95 |
| 33 | " | " | 50 | " | 50 | — | — | 1 | 56 | 95 |
| 34 | " | " | 40 | " | 60 | — | — | 0-1 | 62 | 95 |
| 35 | " | " | 30 | " | 70 | — | — | 0-1 | 58 | 95 |
| 36 | " | " | 20 | " | 80 | — | — | 0-1 | 64 | 95 |
| 37 | " | " | 10 | " | 90 | — | — | 1 | 58 | 95 |
| 38 | " | " | 50 | — | — | B-82 | 50 | 1 | 68 | 100 |
| 39 | " | " | 40 | — | — | " | 60 | 1 | 72 | 100 |

-continued

| Example | Backing | CAB Type | Parts | Copolyester Type | Parts | Acrylate Type | Parts | Ink retention | Unwind force, oz/in | Adhesion retention, % |
|---|---|---|---|---|---|---|---|---|---|---|
| 40 | '' | '' | 30 | — | — | '' | 70 | 1–2 | 76 | 100 |
| 41 | '' | '' | 20 | — | — | '' | 80 | 1 | 68 | 100 |
| 42 | '' | '' | 10 | — | — | '' | 90 | 1 | 72 | 100 |

EXAMPLE 43

This example describes the preparation of a 3 component backsize blend including equal parts (solids basis) of 1/10-sec. CAB, 46950, and an aromatic polyester urethane. The CAB and the 46950 were put into solution in the manner described in connection with the previous examples. The polyester urethane, which is believed to be the reaction product of isophthalic and/or terephthalic acid, glycerol, and a diisocyanate, has an adhesive welding temperature of 75°C., a molecular weight of 37,000, and a melt index of 2.0 grams/10 minutes at 350°F. (ASTM Test Method D1238), commercially available from Ruco Division of Hooker Chemical Corp. under the trade designation "Rucothane" P-257. The polyester urethane was dissolved in methyl ethyl ketone to a solids concentration of 10% prior to blending the three components. The blended solution was then coated on a 2-mil film of biaxially oriented polyethylene terephthalate and the solvent evaporated, all as described in connection with previous examples.

When subjected to the test described hereinabove, the 3-component backsize showed an ink retention value of 0, an unwind force of 48 ounces per inch of width, and an adhesion retention value of 102%. When the ink retention test was repeated, substituting any of several different silk screen inks for the flexographic ink, it was observed that excellent results were obtained in all cases; these results were signigificantly better than for any of the 2-component backsizes described in the previous examples. Among the silk screen inks evaluated were a gloss vinyl ink (Nazdar GV-152), a synthetic gloss enamel (Nazdar 59-152), a modified acrylic lacquer (Nazdar 70-152), a lacquer for polyesters (Advance Ink RAM-413) and a supergloss universal brilliant ink (Advance Ink ASG-405).

From the foregoing examples, it will be apparent that not all polymer glands function equally effectively on all backings and that a modest amount of experimentation may be required to achieve optimum results in specific circumstances. For example, polyester backings should be backsized with compositions which contain copolyesters as a component, whereas UPVC backings should be backsized with compositions containing acrylate copolymers; the latter compositions are also effective on most tapes having a backing comprising paper, including saturated or otherwise treated paper. Other backings should be similarly receptive to treatment in accordance with the invention. It will also be recognized that, although backsize coatings of the invention are especially useful for tapes which have extremely aggressive pressure-sensitive adhesives, such coatings are also useful in connection with tapes having more moderate adhesives.

What is claimed is as follows:

1. In a pressure-sensitive tape comprising a backing, a layer of normally tacky and pressure-sensitive adhesive coated over and firmly adherently bonded to the face side of said backing, and a low adhesion backsize coated over and firmly adherently bonded to the back side of said backing, the improvement which comprises (1) utilizing biaxially oriented polyethylene terephthalate film as the backing and (2) utilizing as the low adhesion backsize a blend of polymers consisting essentially of 5 to 80 parts by weight of cellulose acetate butyrate and correspondingly 95 to 20 parts by weight of synthetic polymer selected from the class consisting of linear saturated ethylene terephthalate:ethylene isophthalate copolyesters; whereby (a) the back side of said tape can be printed with flexographic ink indicia and said adhesive will not remove more than about 5% of said indicia when placed in contact therewith and subsequently stripped away, (b) when wound in roll form and unwound therefrom, the unwind force of the tape will not exceed about 70 ounces per inch of width, and (c) the tape will display in adhesion value of at least 95%.

2. The tape of claim 1 wherein the blend of polymers consists essentially of substantially equal parts of (a) cellulose acetate butyrate, (b) copolyester and (c) polyurethane.

3. The tape of claim 1 wherein the copolymer is the reaction product of components consisting essentially of terephthalic acid, isophthalic acid, aliphatic diacid, and at least one glycol.

4. The tape of claim 1 wherein lineally aligned strong filaments extend lengthwise of the tape and are disposed within the pressure-sensitive adhesive on the face side of the backing.

5. In a pressure-sensitive tape comprising a backing, a layer of normally tacky and pressure-sensitive adhesive coated over and firmly adherently bonded to the face side of said backing, and a low adhesion backsize coated over and firmly adherently bonded to the back side of said backing, the improvement which comprises (1) utilizing unplasticized polyvinyl chloride film as said backing and (2) utilizing as the low adhesion backsize and a blend of polymers consisting essentially of 5 to 80 parts by weight of cellulose acetate butyrate and correspondingly 95 to 20 parts by weight of a polymer formed by reacting monomeric components consisting essentially of at least one lower alkyl ester of acrylic acid and/or methacrylic acid, whereby (a) the back side of said tape can be printed with flexographic ink indicia and said adhesive will not remove more than about 5% of said indicia when placed in contact therewith and subsequently stripped away, (b) when wound in roll form and unwound therefrom, the unwind force will not exceed about 70 ounces per inch of width, and (c) the tape will display an adhesion value of at least 95%.

6. The tape of claim 5 wherein the lower alkyl ester is a copolymer formed by reacting components consisting essentially of approximately equal parts by weight of ethyl acrylate and methyl methacrylate.

* * * * *

UNITED STATES PATENT AND TRADEMARK OFFICE
CERTIFICATE OF CORRECTION

PATENT NO. : 3,967,031
DATED : June 29, 1976
INVENTOR(S) : Richard J. Lambert

It is certified that error appears in the above-identified patent and that said Letters Patent are hereby corrected as shown below:

Col. 1, line 15, "have" should read --has--.

Col. 6, in the Table, first entry under the heading "Unwind force, oz/in", "70" should read -- $\leq$ 70 --.

Col. 6, in the Table, first entry under the heading "Adhesion retention %", "90" should read -- $\geq$ 90 --.

Col. 7, line 47, "glands" should read -- blends --.

Signed and Sealed this

First Day of November 1977

[SEAL]

Attest:

RUTH C. MASON
*Attesting Officer*

LUTRELLE F. PARKER
*Acting Commissioner of Patents and Trademarks*